United States Patent
Kimura et al.

(12)

(10) Patent No.: US 6,927,244 B2
(45) Date of Patent: Aug. 9, 2005

(54) HEAT-RESISTANT VIBRATION DAMPING RUBBER COMPOSITION

(75) Inventors: Norihito Kimura, Kasugai (JP); Akihiro Shibahara, Inuyama (JP)

(73) Assignee: Tokai Rubber Industries, Ltd., Komaki (JP)

( * ) Notice: Subject to any disclaimer, the term of this patent is extended or adjusted under 35 U.S.C. 154(b) by 162 days.

(21) Appl. No.: 10/427,019

(22) Filed: Apr. 30, 2003

(65) Prior Publication Data

US 2003/0220438 A1 Nov. 27, 2003

(30) Foreign Application Priority Data

May 20, 2002 (JP) ........................................ 2002-144297

(51) Int. Cl.$^7$ ................................................. C08K 9/06
(52) U.S. Cl. ........................ 523/213; 524/492; 524/493
(58) Field of Search ................................ 524/492, 493; 523/213

(56) References Cited

U.S. PATENT DOCUMENTS 3,873,489 A * 3/1975 Thurn et al. ................. 524/262

FOREIGN PATENT DOCUMENTS

| EP | 0 731 133 A2 | 9/1996 |
| EP | 1 191 058 A1 | 3/2003 |
| JP | 11-193338 | 7/1999 |
| JP | 2002-020548 | 1/2002 |
| WO | WO 02/48256 A2 | 6/2002 |

OTHER PUBLICATIONS

USPTO obtained translation of JP 11–193338–A.*

USPTO obtained translation of JP 2002–020548–A.*

* cited by examiner

Primary Examiner—Matthew A. Thexton
(74) Attorney, Agent, or Firm—Burr & Brown

(57) ABSTRACT

A heat-resistant vibration damping rubber composition wherein 20–80 parts by weight of a powder of silica having a BET specific surface area of 20–70 $m^2/g$ is mixed with 100 parts by weight of an ethylene-propylene-diene rubber material, and a sulfur-containing silane coupling agent and a mercapto-based silane coupling agent are both mixed with the ethylene-propylene-diene rubber.

6 Claims, 1 Drawing Sheet

HEAT-RESISTANT VIBRATION DAMPING RUBBER COMPOSITION

This application is base on Japanese Patent Application No. 2002-144297 filed on May 20, 2002, the contents of which are incorporated hereinto by reference.

BACKGROUND OF THE INVENTION

1. Field of the Invention

The present invention relates in general to a heat-resistant vibration damping rubber composition, and more particularly to a heat-resistant vibration damping rubber composition which is formed by using an ethylene-propylene-diene rubber (EPDM) material and which exhibits not only excellent thermal resistance properties (thermal stability), but also durability and vibration damping characteristics that are both improved over conventional heat-resistant vibration damping rubber compositions.

2. Discussion of Related Art

In automotive roadway vehicles or railway vehicles, a vibration damping rubber structure of various types is conventionally interposed between two members of a vibration or shock transmitting system, for the purpose of preventing transmission of the vibration or shock to rigid components or members.

Such vibration damping rubber structures as described above, engine mounts used on automobiles, for instance, principally use natural rubbers (NR), or blends or mixtures of natural rubbers (NR) and synthetic rubbers such as styrene-butadiene rubbers (SBR) or butadiene rubbers (BR), since the natural rubbers and such mixtures are excellent in vibration damping characteristics and durability.

In recent years, there have been increasing demands for reducing fuel consumption and generation of noises externally of the vehicles, and purifying exhaust emissions. Accordingly, there has been a tendency toward an increase in the temperature within an engine room, so that the vibration damping rubber structures used as the engine mounts tend to be exposed to a comparatively high-temperature environment. Therefore, the vibration damping rubber structures disposed within or adjacent to the engine room are required to exhibit improved heat resistance properties. However, the conventional vibration damping rubber structures using a natural rubber (NR) or a mixture of the natural rubber and a synthetic rubber as described above suffer from drawbacks such as deterioration of physical properties and relatively early creep, due to exposure to the high-temperature environment, since the natural rubber (NR) which is the principal rubber component of the rubber composition has an insufficient degree of heat resistance. Accordingly, it has been considerably difficult to manufacture a vibration damping rubber structure which exhibits satisfactory thermal resistance properties.

In view of the drawbacks of the conventional vibration damping rubber structures indicated above, there have recently been proposed to use various kinds of vibration damping rubber composition which use known synthetic rubbers having a high degree of thermal resistance, such as ethylene-propylene-diene rubber (EPDM), in place of the natural rubber (NR) which has been used as a rubber material having excellent durability and vibration damping characteristics.

Although the EPDM material has excellent thermal resistance properties, this material which has a comparatively low molecular weight has a low degree of creep resistance and a high degree of dynamic spring stiffness, and has difficulty to give the vibration damping rubber composition sufficient durability and excellent vibration damping characteristics required for the vibration damping rubber structure. In an effort to lower the dynamic spring stiffness and improve the durability of the vibration damping rubber composition using the EPDM material, there have been proposed various approaches, for example, an attempt to increase the molecular weight of the EPDM material to an extent possible to avoid an adverse influence on the mixing and formability of the rubber composition, and an attempt to add as a reinforcing agent a high-structure carbon black. However, none of such approaches permits the rubber composition using the EPDM material to exhibit the durability and dynamic spring stiffness which are comparable with those of the known rubber composition using the natural rubber (NR). Thus, the known vibration damping rubber composition using the EPDM material still suffers from some problems such as insufficiency of an vibration damping effect achieved by the vibration damping rubber structure.

SUMMARY OF THE INVENTION

The present invention was made in view of the prior art problems discussed above. It is therefore an object of the present invention to provide a vibration damping rubber composition which is formed by using an ethylene-propylene-diene rubber material having excellent thermal resistance properties and which exhibits a low degree of dynamic spring stiffness and excellent vibration damping characteristics that cannot be obtained by any conventional heat-resistant vibration damping rubber compositions.

In an effort to achieve the object indicated above, the present inventors have made extensive studies and had a finding that the dynamic spring stiffness can be effectively lowered by using silica as a reinforcing agent in place of conventionally used carbon black, and a silane coupling agent for chemically bonding the silica with the ethylene-propylene-diene rubber (EPDM) material to thereby increase the affinity between the reinforcing agent and the EPDM material. This finding was based on a recognition that the carbon black commonly used in the prior art as the reinforcing agent has a relatively low degree of affinity or interaction with the EPDM material, and therefore causes reduction in the dynamic spring stiffness of the obtained rubber composition due to a friction between the EPDM material and the carbon black. As a result of further studies by the inventors, they found a fact that the use of a silica material having a comparatively small BET specific surface area and the use of a sulfur-containing silane coupling agent and a mercapto-based silane coupling agent as the silane coupling agent make it possible to further lower the dynamic spring stiffness of the rubber composition, and assure sufficiently high stability to give the rubber composition physical properties such as durability and creep resistance which are comparable with those of the rubber composition using the natural rubber.

The present invention was completed based on the findings described above. The object indicated above may be achieved according to the principle of the present invention, which provides a heat-resistant vibration damping rubber composition wherein 20–80 parts by weight of a powder of silica having a BET specific surface area of 20–70 $m^2/g$ is mixed with 100 parts by weight of an ethylene-propylene-diene rubber material, and a sulfur-containing silane coupling agent and a mercapto-based silane coupling agent are both mixed with the ethylene-propylene-diene rubber.

In the heat-resistant vibration damping rubber composition of the present invention described above, the powder of silica having a relatively small BET specific surface area is mixed with the ethylene-propylene-diene rubber material, at a suitable ratio of the powder of silica to the ethylene-propylene-diene rubber material. Further, the sulfur-containing silane coupling agent and the mercapto-based silane coupling agent serving as a silane coupling agent for chemically bonding the powder of silica with the rubber material are both mixed with the mixture of the powder of silica and the rubber material. A vibration-damping rubber structure formed by vulcanizing the present heat-resistant vibration damping rubber composition has excellent heat resistance properties owing to the properties of the ethylene-propylene-diene rubber material, and not only exhibits effectively lowered dynamic spring stiffness and accordingly improved vibration damping characteristics, but also assures sufficiently high stability in the improvement of the physical properties such as the durability and creep resistance.

According to one preferred form of the invention, each of the sulfur-containing silane coupling agent and said mercapto-based silane coupling agent is mixed with the mixture, by an amount corresponding to 1–10% by weight of the powder of silica. The present form of the invention assures the above-described advantages with increased stability.

According to another preferred form of the invention, a ratio in weight of the sulfur-containing silane coupling agent to said mercapto-based silane coupling agent is within a range between 1:9 and 9:1.

DETAILED DESCRIPTION OF THE INVENTION

The ethylene-propylene-diene rubber (EPDM) material used as a major component of the vibration damping rubber composition of the present invention is not particularly limited, and may be a known three-component copolymer of ethylene, propylene and diene. For instance, the diene as the third component may be selected from the group consisting of 1,4-pentadiene; 1,4-hexadiene; 1,5-hexadiene; 2,5-dimethyl-1,5-hexadiene; 1,4-octadiene; 1,4-cyclohexadiene; cyclooctadiene; dicyclopentadiene; 5-ethylidene-2-norbornene; 5-butylidene-2-norbournane; 2-methallyl-5-norbornane and 2-isopropenyl-5-norbornene. At least one of the members of the above-indicated group may be used as the diene component. Further, the proportion of the ethylene component, propylene component and diene component of the EPDM material may be suitably determined depending upon the required properties of the obtained rubber composition. The rubber composition formed by using the EPDM material described above are given excellent thermal resistance properties.

As in the prior art, a reinforcing agent or filler is mixed with the EPDM material, to provide the rubber composition of the present invention with physical properties and vibration damping characteristics that are required for the rubber composition to function as a vibration damping rubber structure. As described above, the EPDM material has a relatively low degree of affinity with carbon black, and a friction between the EPDM material and the carbon black causes an undesired increase in the dynamic spring stiffness. The dynamic spring stiffness is defined by a dynamic/static ratio ($Kd_{100}/Ks$) of spring constant of the rubber composition, which is a ratio of a dynamic spring constant $Kd_{100}$ to a static spring constant $Ks$ of the rubber composition. The dynamic spring constant $Kd_{100}$ is obtained when it is subjected to vibrations of comparatively high frequency not lower than 100 Hz. The use of the carbon black as the reinforcing agent does not permit the rubber composition to exhibit soft dynamic spring characteristics with respect to the input vibrations of comparatively high frequency not lower than 100 Hz. In view of this, a powder of silica is used in place of the carbon black commonly added to the conventional vibration damping rubber composition, and silane coupling agents are used to chemically bond the powder of silica to the EPDM material, for thereby effectively increasing the affinity of the reinforcing agent and the rubber material, to lower the dynamic spring stiffness of the vibration damping rubber structure.

The powder of silica is commercially available with various particle sizes. It is noted that the dynamic spring stiffness decreases with an increase in the particle size of the powder of silica that is, with a decrease in the BET specific surface area of the silica powder. According to the present invention, the powder of silica is required to have a comparatively small BET specific surface area within a range of 20–70 $m^2/g$. The silica powder whose BET specific surface area is smaller than 20 $m^2/g$ has an excessively small particle size, making it difficult to mix the silica powder with the rubber material to form the desired rubber composition. On the other hand, the silica powder whose BET specific surface area is larger than 70 $m^2/g$ causes an excessive increase in the dynamic spring stiffness of the vibration damping rubber structure, resulting in a failure of the rubber structure to exhibit the desired vibration damping characteristics.

The BET specific surface area is measured in accordance with "D method using automatic specific-surface-area measuring device of flow type, model 2300" described at "7. Nitrogen Adsorption Specific Surface Area" in "Testing Methods of Fundamental Characteristics of Carbon Black for Rubber Industry", JIS-K-6217-1997.

In the rubber composition of the present invention, the 20–80 parts by weight of the above-described powder of silica should be mixed with 100 parts by weight of the EPDM material. Where the content of the silica powder is smaller than 20 parts by weight, the function achieved by the silica powder to reinforce the rubber composition is not sufficient, making it difficult or impossible to improve the durability and other physical properties of the rubber composition. Where the content of the silica powder is larger than 80 parts by weight, the dynamic spring constant of the rubber composition is excessively high, and the silica particles tend to agglomerate, causing an increase in the Mooney viscosity of the mixture of the rubber material and the silica powder, which deteriorates the state of mixing and formability of the rubber composition. Accordingly, the ratio of the silica powder to the rubber material should be held within the range specified above. Preferably, 30–50 parts by weight of the silica powder is mixed with 100 parts by weight of the EPDM material.

The silane coupling material used for chemically bonding the powder of silica and the EPDM material may be selected from among various known kinds of silane coupling agent, provided the silane coupling material includes both of the sulfur-containing silane coupling agent having a sulfur group (—S—) bonded to two atoms other than hydrogen atoms, and the mercapto-based silane coupling agent having a mercapto group (—SH). The use of both of the sulfur-containing and mercapto-based silane coupling agents makes it possible to effectively lower the dynamic spring stiffness of the rubber composition, and assure high stability to give the rubber composition the durability, creep resistance and other physical properties that are comparable with those of the rubber composition using the natural rubber. While a mechanism by which those advantages are provided by using those two silane coupling agents, the rubber composition of the invention has a sufficiently low degree of dynamic spring stiffness and improved durability and other physical properties, which cannot be obtained by the conventional heat-resistant vibration damping rubber composition.

The silane coupling material used in the present invention is not particularly limited, as long as the silane coupling material includes the silane coupling agent having a divalent group (—S—) of sulfur and the silane coupling agent having a mercapto group (—SH), as described above. Namely, at least one kind of sulfur-containing silane coupling agent and at least one kind of mercapto-based silane coupling agent are suitably selected from the known kinds of silane coupling agent, to use a combination of the selected kinds of sulfur-containing and mercapto-based silane coupling agents. For instance, the sulfur-containing agent may be selected from the group of polysulfide, for example, selected from among: 4,4,13, 13-tetraethoxy-3,14-dioxa-8,9-dithia-4,13-disila-hexadecane; 4,4, 15,15-tetraethoxy-3,16-dioxa-8,9,10,11-tetrathia-4,15-disila-octadecane; γ-trimethoxysilylpropyldimethylthiocarbamyltetrasufide; γ-trimethoxysilylpropyl benzothiazyltetrasulfide. The mercapto-based silane coupling agent may be represented by the following chemical formula [1], for example, γ-mercaptopropyltrimethoxy silane.

$(RO)_3SiC_nH_{2n}SH$ [Chemical Formula 1]

In the above formula 1, "R" represents the methyl group or ethyl group, while "n" represents an integer from 1 to 8.

It is desirable that each of the sulfur-containing silane coupling agent and the mercapto-based silane coupling agent is mixed with the rubber material and the powder of silica, by an amount corresponding to about 1–10% by weight of the powder of silica, preferably about 2–5% by weight of the powder of silica. When the amount of the sulfur-containing or mercapto-based silane coupling agent is larger than the upper limit corresponding to about 10% by weight of the powder of silica, the sulfur included in the silane coupling agent causes a permanent compressive strain, that is, deteriorates the creep resistance. When the amount is smaller than the lower limit corresponding to about 1% by weight of the powder of silica, the addition of the silane coupling agent does not provide a sufficient effect of chemically bonding the silica powder to the rubber material.

It is desirable that a ratio in weight of the sulfur-containing silane coupling agent to the mercapto-based silane coupling agent is within a range between 1:9 and 9:1, preferably, between 2:8 and 8:2, so that the use of both of the sulfur-containing silane coupling agent and the mercapto-based silane coupling agent provides a highly synergistic effect for chemical bonding of the silica powder with the rubber material.

Generally, the particles of the silica powder having a suitably selected BET specific surface area are coated with the silane coupling agents selected as described above. The coated silica particles are dispersed in the rubber material, so that an unvulcanized heat-resistant vibration damping rubber composition according to the present invention is prepared. The thus prepared unvulcanized rubber composition is vulcanized into the vibration damping rubber structure having excellent heat resistance properties. Before the unvulcanized rubber composition is vulcanized, a vulcanizing agent (cross-linking agent) is added to the unvulcanized rubber composition. The vulcanizing agent may be suitably selected from among various known kinds of vulcanizing agent capable of performing a desired vulcanizing reaction with the EPDM material. The amount of the vulcanizing agent to be added to the unvulcanized rubber composition is determined depending upon the amount of the EPDM material. In particular, the vulcanizing agent is preferably selected from among peroxides such as dicumyl peroxides, di-t-butyl peroxydiisopropylbenzene, n-butyl-4, 4-bis(t-butylperoxy)valerate, and t-butylcumyl peroxides.

Further, various known additives generally used for forming a rubber composition may be added to the rubber material, as needed, without departing from the spirit of the present invention. For example, the additives include: vulcanization promoting agents or cross-linking aids; softening agents such as paraffin oils; aging preventive agents; plasticizers; stabilizers; forming aids; and coloring agents.

The heat-resistant vibration damping rubber composition of the present invention is prepared by mixing the above-indicated powder of silica, sulfur-containing silane coupling agent, mercapto-based silane coupling agent, and desired additives with the EPDM material, in a known manner, for example, by using a kneader, a Banbury mixer, a roller, or any other suitable kneading or mixing device. Described in detail, the unvulcanized EPDM material, silica powder whose particles are coated with the sulfur-containing and mercapto-based silane coupling agents, and desired additives for rubber compositions are introduced into the kneading or mixing device, and mixed together into the desired rubber composition of the invention.

The thus prepared rubber composition is heated to vulcanize the unvulcanized EPDM material in the rubber composition, to thereby form the heat-resistant vibration damping rubber structure having excellent heat resistance properties. For instance, the rubber composition of the present invention is suitably used for manufacturing various kinds of vibration damping rubber structures for automotive vehicles, such as strut mounts, strut bar cushions and suspension bushings, and engine mounts. The present rubber composition is particularly suitable for the engine mounts used in high-temperature environments.

BRIEF DESCRIPTION OF THE DRAWINGS

The above and other objects, features, advantages and technical and industrial significance of the present invention will be better understood by reading the following detailed description of an example of the invention and comparative examples, when considered in connection with the accompanying drawings, in which.

EXAMPLES

Figure 1:
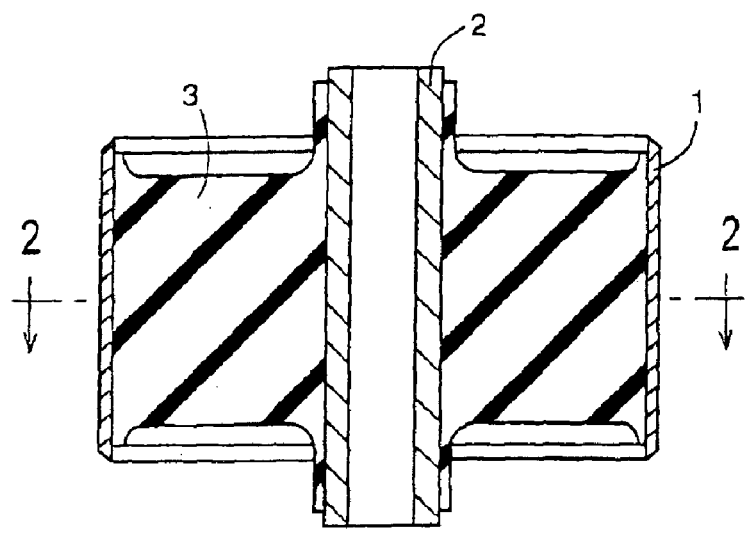
FIG. 1 is an elevational view in axial cross section of a testpiece used in a durability test to investigate the durability of a heat-resistant vibration damping rubber composition according to an embodiment of this invention as compared with the comparative examples.

To further clarify the present invention, there will be described one example or embodiment of the invention. However, it is to be understood that this invention is not limited to the details of the illustrated example, but may be embodied with various changes, alterations or modifications, which may occur to those skilled in the art, without departing from the spirit of the invention.

Initially, the unvulcanized EPDM material was prepared as the rubber material, and four kinds "a", "b", "c" and "d"

of silica powder which have respective BET specific surface areas as indicated in TABLE 1 given below were prepared. Further, four kinds A, B, C and D of silane coupling agents as indicated in TABLE 2 given below were prepared.

TABLE 1

| Silica Powder | BET Specific (m2/g) | Particle Size |
|---|---|---|
| a | 140 | Small |
| b | 120 | ↓ |
| c | 90 | Large |
| d | 50 | |

TABLE 2

| | Silane Coupling Agents | Trade Names | Manufacturers | Compounds |
|---|---|---|---|---|
| A | Vinyl-based | KBE1003 | Shinetsu Kagaku Kogyo | Vinyltriethoxy silane |
| B | Methacryloxy-based | KBM503 | Shinetsu Kagaku Kogyo | γ-(methacryloxy propyl)trimethoxy silane |
| C | Mercapto-based | KBM803 | Shinetsu Kagaku Kogyo | γ-mercaptopropyl trimethoxy silane |
| D | Sulfur-containing | Si75 | Degussa AG (Germany) | 4,4,13,13-tetra thoxy-3,14-dioxa-8,9-dithia-4,13-disila-hexadecane |

Then, the silica powder, silane coupling agent, softening agent and vulcanizing agent were mixed with 100 parts by weight of the EPDM material, in an ordinary manner, in different combinations thereof and with proportions indicated in TABLE 3 given below, so that Example 1 of the invention and Comparative Examples 1–9 of rubber compositions were prepared. Dicumyl peroxide was used as the vulcanizing agent, and paraffin oil was used as the softening agent.

The Mooney viscosity values of the rubber compositions of Example 1 of the present invention and Comparative Examples 1–9 were measured according to a method described at "6. Mooney Viscosity Test" in "Physical Testing Methods for Unvulcanized Rubber", JIS-K-6300-1994, using a L-type rotor, under the following testing condition:

Pre-heating time: one (1) minute
Rotating time of the rotor: three (3) minutes
Testing temperature: 121° C.

The measured Mooney viscosity values of the Examples are indicated in TABLES 4-1 and 4-2 given below.

The EPDM material of the rubber compositions of Example 1 and Comparative Examples 1–9 was vulcanized at 170° C. for 30 minutes, so as to form various testpieces to be subjected to a tensile strength test, a hardness test, a permanent compressive strain test, a durability test and a dynamic characteristic test. The thus formed testpieces were subjected to the various tests in the following manners.

—Tensile Strength Test—

The testpieces for the tensile strength test, which are No. 5 dumbbell pieces in conformity with "Tensile Testing Methods for Vulcanized Rubber", JIS-K-6251-1993, were subjected to the tensile strength test in conformity with "Tensile Testing Methods for Vulcanized Rubber", JIS-K-6251-1993, using a suitable tensile strength tester. In the test, the testpieces were elongated until they were broken or ruptured. A maximum stress (tensile strength) and an amount of elongation (breaking elongation) at which the testpieces were broken were measured. The measurements are also indicated in TABLES 4-1 and 4-2.

—Hardness Test—

The testpieces for the hardness test, which are 2 mm-thick pieces in conformity with "Durometer Hardness Test" in "Hardness Testing Methods for Rubber, Vulcanized or Thermoplastic", JIS-K-6253-1997, were subjected to the tensile strength test, using type A durometer in conformity with "Durometer Hardness Test", JIS-K-6253-1997. In the hardness test, the hardness values of the testpieces were measured. The measurements are also indicated in TABLES 4-1 and 4-2.

—Permanent Compressive Strain Test—

The testpieces for the permanent compressive strain test, which are large-sized testpieces in conformity with "Perma-

TABLE 3

(Contents Indicated in Parts by Weight)

| | | Example | Comparative Examples | | | | | | | | |
|---|---|---|---|---|---|---|---|---|---|---|---|
| | | 1 | 1 | 2 | 3 | 4 | 5 | 6 | 7 | 8 | 9 |
| EPDM | | 100 | 100 | 100 | 100 | 100 | 100 | 100 | 100 | 100 | 100 |
| Silica | a | — | 35 | — | — | — | — | — | — | — | — |
| | b | — | — | 40 | — | — | — | — | — | — | — |
| | c | — | — | — | 45 | — | — | — | — | — | — |
| | d | 40 | — | — | — | 45 | 40 | 40 | 40 | 40 | 40 |
| Silane coupling agent | A | — | 2 | 2 | 2 | 2 | — | 2 | — | — | — |
| | B | — | — | — | — | — | — | — | 2 | — | — |
| | C | 2 | — | — | — | — | — | — | — | 2 | — |
| | D | 2 | — | — | — | — | — | — | — | — | 2 |
| Paraffin oil | | 30 | 40 | 40 | 40 | 40 | 30 | 30 | 30 | 30 | 30 |
| Vulcanizing agent | | 4 | 4 | 4 | 4 | 4 | 4 | 4 | 4 | 4 | 4 | nent Set Testing Methods for Rubber, Vulcanized or Thermoplastic", JIS-K-6262-1997, were subjected to the permanent compressive strain test in conformity with "5. Permanent Compressive Strain Test", JIS-K-6262-1997. In this test, the testpieces were held compressed at a predetermined compression ratio, with a load applied thereto by a suitable compressing device, at 125° C. for 250 hours. Then, the load was removed from the testpieces, and the testpieces were kept cooled at the room temperature for a suitable length of time. The thickness of each testpiece was measured at its central portion, and the amount of the permanent compressive strain was obtained from the measured thickness. The obtained amounts of the permanent compressive strain are also indicated in TABLES 4-1 and 4-2.

—Durability Test—

Figure 2:
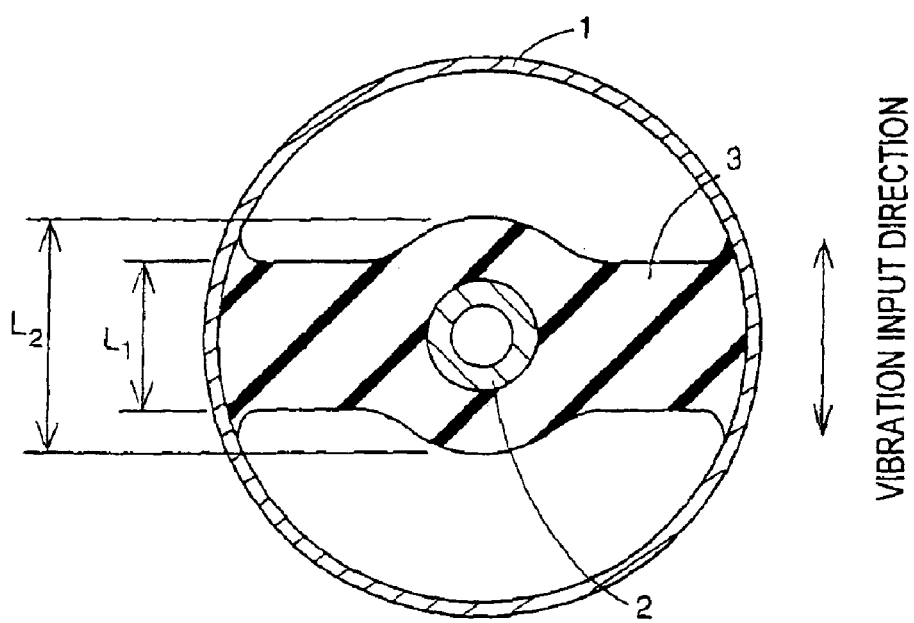
FIG. 2 is a cross sectional view taken along line 2—2 of FIG. 1.

As the testpieces for the durability test, there were prepared vibration damping devices each including a vibration damping rubber member as shown in FIGS. 1 and 2. The vibration damping device includes a metallic thin-walled outer sleeve 1 having an outside diameter of 81 mm and an axial dimension of 49 mm, and a metallic thick-walled inner sleeve 2 which is coaxially disposed inwardly of the outer sleeve 1 and which has an outside diameter of 16 mm and an axial dimension of 70 mm. These outer and inner sleeves 1, 2 are integrally connected to each other by the vibration damping rubber member in the form of a rubber body 3, which was formed of the rubber composition of the Examples. The rubber body 3 elastically connecting the outer and inner sleeves 1, 2 has an axial dimension of 38 mm, and dimensions $L_1$ and $L_2$ as indicated in FIG. 2. The dimension $L_1$ is 22 mm while the dimension $L_2$ is 36 mm. The dimension $L_1$ is a dimension of an intermediate portion of the rubber body 3 as seen in the radial direction of the sleeves 1, 2, while the dimension $L_2$ is a dimension of a central portion of the rubber body 3 in which an axially intermediate portion of the inner sleeve 2 is embedded. The testpieces were subjected to a vibration of 3 Hz, so as to cause an oscillatory displacement of ±14 mm in a direction indicated by arrows in FIG. 2. The number of oscillations of each testpiece until the rubber body 3 was broken or fractured was measured. The measured numbers of the testpieces, which represent their durability, are also indicated in TABLES 4-1 and 4-2.

—Dynamic Characteristic Test—

Each of the testpieces for the dynamic characteristic test was prepared by first preparing a vulcanized cylindrical rubber body having a diameter of 50 mm and an axial dimension of 25 mm, and then bonding a pair of metallic circular plates having a diameter of 60 mm and a thickness of 6 mm, with an adhesive agent. The thus prepared testpieces were measured of the static spring constant Ks and the dynamic spring constant Kd, in accordance with "Testing Methods for Rubber Vibration Isolators", JIS-K-6385-1995. Described more specifically, each testpiece was subjected to the static characteristic test in conformity with the "Testing Methods for Rubber Vibration Isolators", JIS-K-6385-1995, in which the test piece was compressed by 7 mm by application of an axial load to the testpiece, and the axial load was then reduced before the testpiece was again compressed by 7 mm by application of the load. In the process of the second application of the axial load (during the second compression), a relationship between the increasing load and amount of compression of the testpiece was obtained, that is, a curve indicative of a change in the amount of compression with a change in the axial load applied was obtained. The static spring constant Ks was calculated on the basis of the load values corresponding to the amounts of compression of 1.5 mm and 3.5 mm.

Further, each testpiece was subjected to a test in conformity with "Non-resonance Method (a)" in "Testing Methods for Rubber Vibration Isolators", JIS-K-6385-1995, in which a constant-displacement harmonic compressive vibration of 100 Hz was applied to the testpiece while the testpiece was kept axially compressed by 2.5 mm, such that the testpiece was oscillated by ±0.05 mm in the opposite directions in the state of axial compression by 2.5 mm. Thus, the dynamic spring constant $Kd_{100}$ of each testpiece under the vibration of 100 Hz was obtained. The dynamic spring stiffness $Kd_{100}/Ks$ was calculated on the basis of the thus obtained dynamic spring constant $Kd_{100}$ and the above-indicated static spring constant Ks. The dynamic spring stiffness $Kd_{100}/Ks$ is also indicated in TABLES 4-1 and 4-2.

In the TABLES 4-1 and 4-2, the tensile strength, breaking elongation and hardness represent the initial physical properties of the testpieces, while the values Ks, $Kd_{100}$, and $Kd_{100}/Ks$ represent the dynamic characteristics of the testpieces.

TABLE 4-1

|  | Example | Comparative Examples | | | | | |
|---|---|---|---|---|---|---|---|
|  | 1 | 1 | 2 | 3 | 4 | 5 | 6 |
| Mooney viscosity [ML(1 + 3)121° C.] | 50 | 60 | 45 | 40 | 36 | 50 | 48 |
| Tensile strength {MPa} | 17.0 | 16.5 | 15.0 | 15.0 | 14.2 | 8.0 | 14.0 |
| Breaking elongation [%] | 450 | 430 | 450 | 450 | 450 | 460 | 380 |
| Hardness [JIS A] | 53 | 55 | 56 | 55 | 55 | 50 | 55 |
| Permanent Compressive strain [%] | 20 | — | — | — | — | 20 | 18 |
| Durability [number: ×1000] | 500< | — | — | — | — | 50 | 250 |
| Ks [N/mm] | 500 | 450 | 445 | 450 | 460 | 440 | 530 |
| Kd100 [N/mm] | 696 | 800 | 770 | 730 | 700 | 709 | 750 |
| Kd100/Ks | 1.39 | 1.78 | 1.73 | 1.62 | 1.52 | 1.61 | 1.42 |

TABLE 4-2

|  | Example | Comparative Examples | | |
|---|---|---|---|---|
|  | 1 | 7 | 8 | 9 |
| Mooney viscosity [ML(1 + 3)121° C.] | 50 | 50 | 49 | 50 |
| Tensile strength {MPa} | 17.0 | 15.0 | 15.0 | 18.0 |
| Breaking elongation [%] | 450 | 440 | 380 | 500 |
| Hardness [JIS A] | 53 | 51 | 56 | 50 |
| Permanent Compressive strain [%] | 20 | 20 | 15 | 40 |
| Durability [number: ×1000] | 500< | 250 | 200 | 500 |
| Ks [N/mm] | 500 | 480 | 550 | 457 |

TABLE 4-2-continued

| | Example | Comparative Examples | | |
|---|---|---|---|---|
| | 1 | 7 | 8 | 9 |
| Kd100 [N/mm] | 696 | 680 | 765 | 650 |
| Kd100/Ks | 1.39 | 1.42 | 1.39 | 1.42 |

It will be understood from TABLES 4-1 and 4-2 that the rubber composition of Example 1 of the present invention wherein both of the sulfur-containing and mercapto-based silane coupling agent as well as the powder of silica having a BET specific surface area of 20–70 m$^2$/g are mixed with the ethylene-propylene-diene rubber material exhibited a lower degree of dynamic spring stiffness and higher degrees of durability and creep resistance than the rubber compositions of Comparative Examples 1–9.

The data in TABLES 4-1 and 4-2 regarding the rubber compositions using the respective four kinds "a", "b", "c" and "d" of silica powder which have the respective different BET specific surface areas, that is, the data regarding Comparative Examples 1–4 indicate that the dynamic spring stiffness decreases with a decrease in the BET specific surface area.

It will also be understood that the rubber composition of Comparative Example 5 not using any silane coupling agent has a higher degree of dynamic spring constant and a lower degree of durability, than the rubber composition of Example 1 of the present invention. It will further be understood that the rubber compositions of Comparative Examples 6–8 using only the vinyl-based, methacryloxy-based or mercapto-based silane coupling agent have lowered dynamic spring constant values, but suffer from insufficient durability, and that the rubber composition of Comparative Example 9 using only the sulfur-containing silane coupling agent has a lowered dynamic spring constant and improved durability, but suffers from a relatively large amount of permanent compressive strain and deterioration of creep resistance.

It will be understood from the foregoing description of the present invention that the heat-resistant vibration damping rubber composition according to the present invention contains the powder of silica having the specified BET specific surface area mixed with the highly heat-resistant EPDM material in a proportion within the specified range, and further contains both of the sulfur-containing silane coupling agent and the mercapto-based silane coupling agent that are also mixed with the EPDM material. The rubber composition of the present invention assures effectively improved heat resistance properties, has a sufficiently low degree of dynamic spring stiffness and improved durability, which cannot be obtained by any conventional heat-resistant vibration damping rubber composition. Accordingly, the present heat-resistant vibration damping rubber composition can be suitably used, particularly as various vibration damping rubber structures or devices for automotive vehicles, such as engine mounts.

What is claimed is:

1. A heat-resistant vibration damping rubber composition wherein 20–80 parts by weight of a powder of silica having a BET specific surface area of 20–70 m$^2$/g is mixed with 100 parts by weight of an ethylene-propylene-diene rubber material, and a silane coupling agent having a sulfur atom bonded to two atoms other than hydrogen atoms and a mercapto-based silane coupling agent are both mixed with said ethylene-propylene-diene rubber.

2. A heat-resistant vibration damping rubber composition according to claim 1, wherein 30–50 parts by weight of said powder of silica is mixed with 100 parts by weight of said ethylene-propylene-diene rubber material.

3. A heat-resistant vibration damping rubber composition according to claim 1, wherein each of said silane coupling agent having a sulfur atom bonded to two atoms other than hydrogen atoms and said mercapto-based silane coupling agent is mixed with said mixture, by an amount corresponding to 1–10% by weight of said powder of silica.

4. A heat-resistant vibration damping rubber composition according to claim 3, wherein said amount corresponds to 2–5% by weight of said powder of silica.

5. A heat-resistant vibration damping rubber composition according to claim 1, wherein a ratio by weight of said silane coupling agent having a sulfur atom bonded to two atoms other than hydrogen atoms to said mercapto-based silane coupling agent is within a range between 1:9 and 9:1.

6. A heat-resistant vibration damping rubber composition according to claim 5, wherein said ratio is within a range between 2:8 and 8:2.

* * * * *